United States Patent
Moore et al.

(10) Patent No.: US 6,260,083 B1
(45) Date of Patent: Jul. 10, 2001

(54) SYSTEM FOR JAVA DATA BLOCK TRANSFERS OF UNKNOWN LENGTH FOR APPLETS AND APPLICATIONS BY DETERMINING LENGTH OF DATA IN LOCAL BUFFER AND PASSING LENGTH OF DATA COMBINED WITH DATA OUT OF PROGRAM

(75) Inventors: Victor S. Moore, Boynton Beach; Glen R. Walters, Hollywood, both of FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/206,070

(22) Filed: Dec. 4, 1998

Related U.S. Application Data

(63) Continuation-in-part of application No. 09/076,391, filed on May 12, 1998, now Pat. No. 6,011,916.

(51) Int. Cl.[7] .............................. G06F 13/14; G06F 13/20
(52) U.S. Cl. .............................. 710/33; 710/34; 709/227; 709/238; 370/399
(58) Field of Search .................................. 710/1, 33, 34; 370/399; 709/227, 238

(56) References Cited

U.S. PATENT DOCUMENTS

| | | | |
|---|---|---|---|
| 5,761,453 | * | 6/1998 | Anderson et al. .................... 395/306 |
| 5,884,040 | * | 3/1999 | Chung .............................. 395/200.57 |
| 5,884,050 | * | 3/1999 | Wheeler et al. ...................... 395/287 |
| 6,034,962 | * | 3/2000 | Ohno et al. .......................... 370/399 |

* cited by examiner

Primary Examiner—Robert Beausoleil
Assistant Examiner—Rehana Perveen
(74) Attorney, Agent, or Firm—Fleit, Kain, Gibbons, Gutman & Bongini P.L.; Jon A. Gibbons

(57) ABSTRACT

In an information processing system, a method to perform I/O (Input/Output) operations for an interpretative based program that is executing on an Interpretative Machine (IM). The method comprises the steps of: executing an interpretative based program on an Interpretative Machine (IM); receiving a request to pass data of unknown length out of the program; allocating a local buffer in the information processing unit to write the data of unknown length; writing the data of unknown length to the local buffer; determining the size of the data of unknown length in the local buffer; and passing the length of the data combined with the data in the buffer out of the program. In accordance with another aspect of the invention, a computer readable medium is described to carry out the above method.

18 Claims, 4 Drawing Sheets

SYSTEM FOR JAVA DATA BLOCK TRANSFERS OF UNKNOWN LENGTH FOR APPLETS AND APPLICATIONS BY DETERMINING LENGTH OF DATA IN LOCAL BUFFER AND PASSING LENGTH OF DATA COMBINED WITH DATA OUT OF PROGRAM

CROSS-REFERENCE TO RELATED APPLICATIONS

This is a continuation-in-part of application Ser. No. 09/076,391, filed May 12, 1998, now U.S. Pat. No. 6,011,916. The entire disclosure of prior application Ser. No. 09/076,391 is herein incorporated by reference.

BACKGROUND OF THE INVENTION

1. Field of the Invention

The invention disclosed broadly relates to the field of computer software development and more particularly relates to the field of software toolkits for application development for Java Applications and Java Applets. The invention provides software developers with a consistent Input/Output (I/O) function interface for both Java Applications and Java Applets.

2. Description of the Related Art

Java is a programming language developed by Sun Microsystems. The basic idea behind Java programming is that the same Java software code can run on many different kinds of computers. Stated differently, the goal of Java is to write software once to be run on any Java compliant platform. These different platforms include both different hardware platforms, e.g., RISC, PC, Macintosh, Sparc and different operating system platforms, e.g., Windows 95/NT, Unix, AIX, Copeland. These platforms cover a large class of completely different machines from large servers to thin clients to small portable consumer devices such as personal digital assistants. Software programming tools are available from a variety of suppliers including Sun Microsystems (refer to online URL www.sun.com/java) for developing Java-based software applications, or more simply called Java Applications. Software tools for performing I/O (Input/Output) operations for Java Applications are called the Java I/O Toolkit. This Java I/O Toolkit provides software developers with a library of object oriented functions for reading and writing to files that are local to the hardware platform in which the Java Application is executing. Other Java I/O Toolkit functions include performing other I/O function across a network. One example is the reading and writing of files to remote servers.

During the development of Java, the Internet and more particular the World Wide Web ("Web") has become immensely popular largely because of the ease of finding information and the user-friendliness of today's browsers. A feature known as hypertext allows a user to access information from one Web page to another Web page by simply pointing (using a pointing device such as a mouse) at the hypertext and clicking. Another feature that makes the Web attractive is having the ability to process the information (or content) in remote Web pages without the requirement of having a specialized application program for each kind of content accessed. Thus, the same content is viewed across different platforms. Browser technology has evolved to enable running of applications that manipulate this content across a wide variety of different platforms.

In 1995, Sun Microsystems formally introduced HotJava. HotJava is a Web browser that can run Java code. Other Web browsers such as Netscape Navigator and Microsoft Internet Explorer have since added Java capability to their base Web browser products. The combination of Web browser technology combined with Java technology has increased the fundamental of appeal of Java, i.e., the ability to write an application once and run the application across a variety of platforms including Web browsers, and while most of the Java code is portable across platforms, including Java-compliant Web browsers, some functions such as returning handles to frames or the handling of Input/Output (I/O) are not portable. Two categories of Java-based programs are necessary. The first category of Java base programs is called a Java Application that runs across computer platforms without being combined with a Web browser. The second category of Java-based programs is called Java Applets that run across systems using Java compliant Web browsers. The reason many functions are not compatible across Java runtime environments of Applets and Applications is due to security concerns. Java Applets are typically loaded by a Web browser being accessed. The Applet by design cannot write to or read from local storage devices. This deliberate limitation for I/O is designed to minimize the destructive use of Java Applets as computer viruses that unknowingly make changes to the compute system of the end user. A Java Applet with local write and read access then could easily create havoc by deleting, renaming, scrambling and otherwise corrupting a user computer system.

Both of these categories of Java-based programs, Java Application and Java Applets, require specialized I/O handling. This specialized I/O is handled by the use of two different Java Classes in the Java I/O toolkit, one class for Java Applets and one class for Java Applications. Because of the requirement of two classes, a developer wishing to create a Java-based software application must treat each run time environment, i.e., Java Applets and Java Applications differently. Because of these different Java I/O toolkit requirements, a software developer is forced to develop separate codes to handle each of these two Java I/O classes. Accordingly, there is a need for a method to provide an I/O class interface that can be used both by Java Applications and Java Applets which overcomes the above problems.

Another problem with using either a Java application or is in the process of writing of an output stream. The HTTP (Hypertext Transfer Protocol) is an application-level protocol with the lightness and speed necessary for distributed collaborative computing in which the Internet is based. More information on the HTTP/1.0 protocol is available via online URL http://www.w3.org/Protocols/rfc1945/rfc1945 from the World Wide Web (W3) Consortium. When an application, using the HTTP protocol transfers data to a servlet, a requirement of HTTP protocol is that the data (called the entity-body) must include the length of the message being sent (called content-length). This requirement of writing the length of the message prior to sending the message can be a problem if the application does not know the length of the message prior to sending the message. An alternate method to transfer data of unknown length, as taught by the HTTP/1.0 protocol, is to terminate the connection between the application and the server. However, the requirement of having to reestablish a connection can be burdensome, especially for an application that requires the transfer of data frequently and repeatedly. Accordingly, there is a need for a method to write a message of unknown length in a Java program without terminating the connection to the server.

Still, another problem, with using a Java application to transfer data or messages of unknown length to a sever, is the desire by software to have one solution work for both Java Applications and Java Applets. Therefore, a need exists to provide one method to transfer data of unknown length that can be used both by Java Applications and Java Applets.

SUMMARY OF THE INVENTION

Briefly, in accordance with the present invention, disclosed is a method to perform I/O (input/Output) operations for an interpretative based program executing on an Interpretative Machine in an information processing unit. The method comprises the steps of: executing an interpretative based program on an Interpretative Machine; receiving a request to pass data of unknown length out of the program; allocating a local buffer in the information processing unit to write the data of unknown length; writing the data of unknown length to the local buffer; determining the size of the data of unknown length in the local buffer; and passing the length of the data combined with the data in the buffer out of the program. In accordance with another aspect of the invention, a computer readable medium is described to carry out the above method.

DETAILED DESCRIPTION OF AN EMBODIMENT

Many programming terms, specifically object oriented programming terms are used throughout this specification and in the attached claims. A short list of object oriented terms used in Java are as follows:

Glossary of Terms Used in this Disclosure

Class—a description of an object. For example, there might be a class called shape that contains objects which are circles, rectangles, and triangles. The class defines all the common properties of the different objects that belong to it. Note: In the example above, each object such as a rectangle may itself be a class (an object is an instance of a class) with common properties that belong to the specific class. For rectangles this these are the length and the width of the rectangle.

Interpretative Machine—a runtime environment for interpretive type programming languages including Basic and Java for executing source code without the need of intermediate steps such as compiling or linking. In the case of Java this is the Java Virtual Machine (VM). In Basic this is the Basic interpreter.

Input—data flow into a program.

Object—an object is a self-contained entity that consists of both data and procedures to manipulate the data. An object is an instance of a class.

Output—data flow out of a program.

Method—a member function in a class.

Procedures—a sequence of programming instructions that may be used in one or more points in a program. Procedures usually have one or more input parameters and can produce one or more output parameters. Procedures are also referred to as functions or routines.

Stream—an abstraction that refers to the flow of data into and out of an application or program. A stream output refers to the process of writing data to a file, to a printer, to a display, to a network, or to any device coupled to a computer for receiving data. An input stream refers to the process of reading data from a file, from a keyboard entry, from a mouse, from a network or from any other device coupled to a computer.

Description

Figure 1:
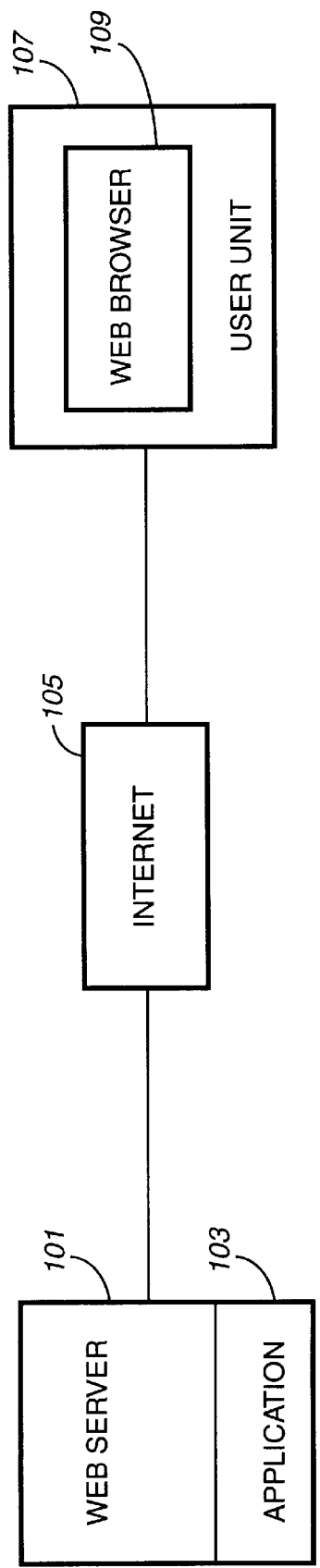
FIG. 1 is a functional block diagram of a typical information processing system for hosting Web pages in which the present invention is implemented.

FIG. 1 depicts a functional block diagram of a typical information processing system for hosting Web pages 100. A Web server 101 running a Web server and application 103. The Web server 101 is connected to the Internet 105. End-user information processing unit 107 with Web browser 109 are connected to the Internet 105. Web server 101 is an IBM PC Server, Sun Sparc Server, HP RISC server or equivalent. The Web browser 109 is any HTTP (Hypertext-Transfer-Protocol) compatible product such as Netscape Navigator, Sun HotJava Browser, Microsoft Internet Explorer or equivalent.

The application 103 is a Web page server application for hosting Web pages on the Web browser 109. The application 103 is written in any software language that can transmit Sun Microsystems Java-based applications to Web browser 109. It is important to point out that the precise operating systems and hardware configurations of the Web server 101, the end-user unit 107 and the Web browser 109 are not limited to any specific hardware or software configuration. These systems can be implemented on a wide variety of hardware and software platforms.

Figure 2:
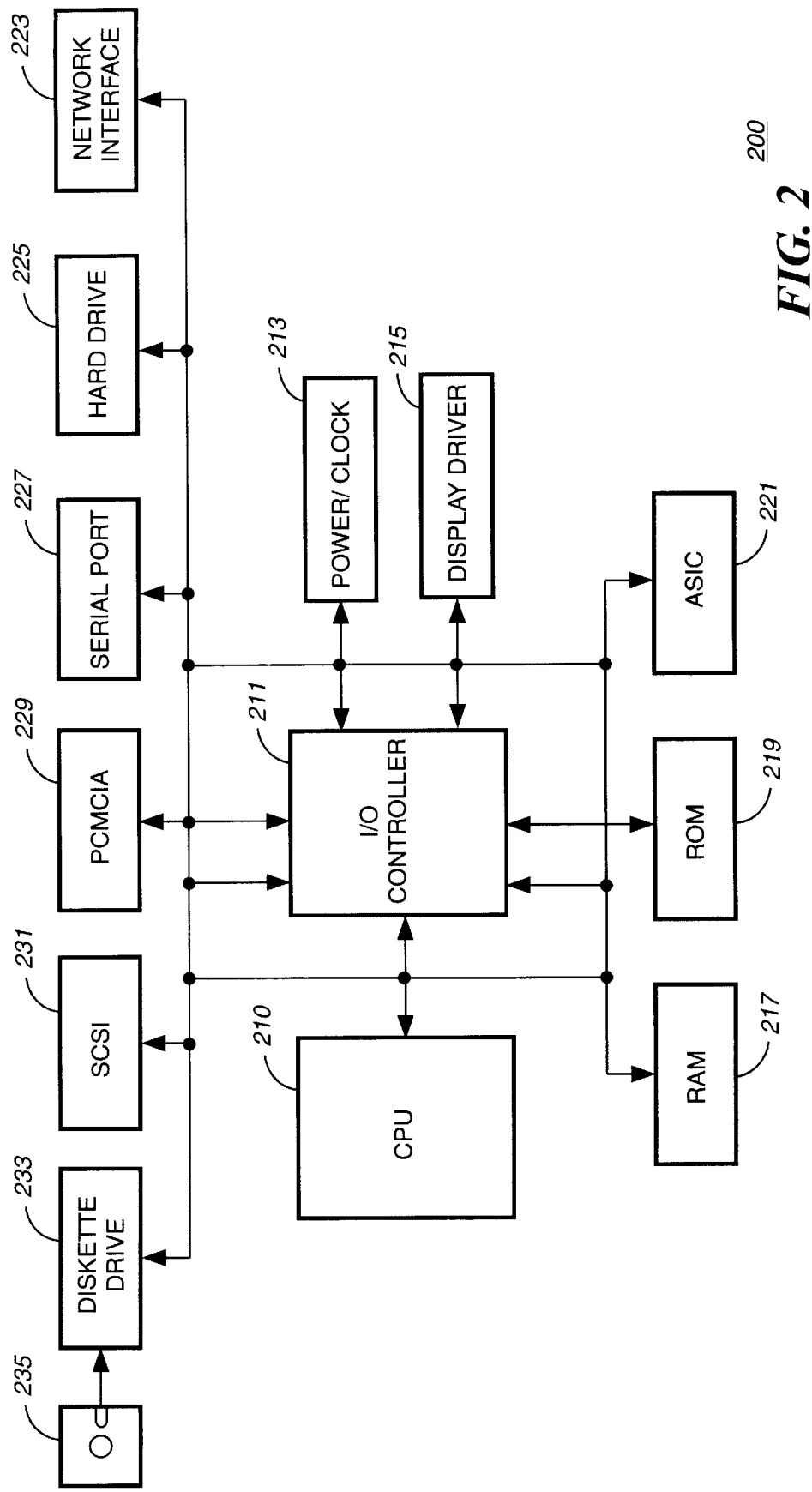
FIG. 2 is a functional block diagram of the major electrical components of an information processing system used in accordance with this invention.

Referring to FIG. 2, there is shown a block diagram of the major electrical components of an information processing system 200 used in accordance with this invention. Information processing system 200 is representative hardware of end-user unit 107 hosting Web browser 109 for Java Applets. In the Java Application mode, information processing system 200 can be a standalone computer-based system. The electrical components of information processing system 200 include: a central processing unit (CPU) 210, an Input/Output (I/O) Controller 211, a system power and clock source 213; a display driver 215; RAM 217; ROM 219; ASIC (application specific integrated circuit) 221 and a hard disk drive 225. These are representative components of a computer. The operation of a computer comprising these elements is well understood. Network interface 223 provides connection to a computer network such as Ethernet, TCP/IP or other popular protocol network interfaces. Optional components for interfacing to external peripherals include: a Small Computer Systems Interface (SCSI) port 231 for attaching peripherals; a PCMCIA slot 229; and serial port 227. An optional diskette drive 233 is shown for loading or saving code to removable diskettes 235. The system 200 may be implemented by combination of hardware and software. Moreover, the functionality required for using the invention may be embodied in computer-readable media (such as 3.5 inch diskette 235) to be used in programming an information-processing apparatus (e.g., a personal computer) to perform in accordance with the invention.

Figure 3:
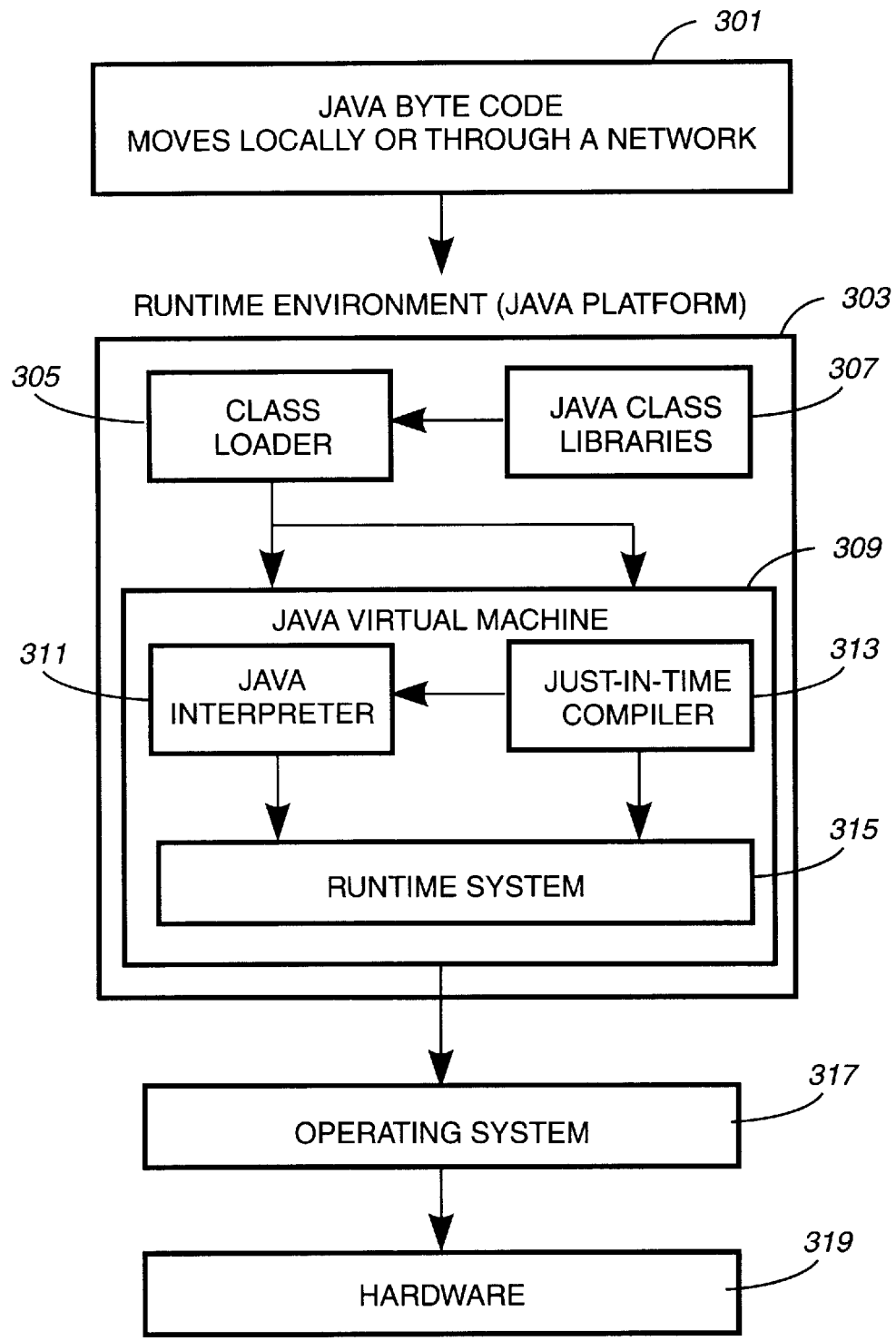
FIG. 3 is a block diagram of Java Runtime environment according to the present invention.

Referring now to FIG. 3 there is shown a block diagram of Java Runtime environment 300 according to the present invention. The Java language was created by Sun Microsystems. More information on Java Software and Java Developers tools is available online URL http:// www.sun.com/java. The use of Java and the creation of Java Applications and Java Applets is well known. Once a software developer writes a Java source code, the code, rather than being compiled into a format designed for a specific platform, Java developers compile Java source into an intermediate form of byte code that can be executed on any system with a runtime environment. Java byte code 301 moves from a local hard disk over a network to a Java runtime environment 303. The Java byte code 301 is an intermediate form of byte code, that unlike platform specific byte code, can be executed on any platform with a Java runtime environment. The Java runtime environment 303 is the platform that enables Java Applications or in the case of Web browsers Java Applets, to run on any system regardless of the operating system and the underlying hardware. When the Java byte code 301 arrives in the runtime environment for a particular computer platform, a class loader 305 retrieves one or more Java class libraries 307 for the given operations specified by the Java byte code 301. The Java byte code 301 and Java class libraries are dynamically loaded in the Java Virtual Machine (VM) 309. The Java VM 309 is the heart of the Java platform. It is the Java VM that is customized to work with a particular operating system 317 such as Unix or Windows NT and with a particular hardware platform 319 such as HP RISC or Intel Pentium class machines. A Just-In-Time compiler 313 for dynamic compiling Java Interpreter 311 and runtime system 315 are known components of the Java VM 309. The Java VM 309 permits portability across a wide variety of hardware 319, such as information processing system 200, and permits portability across a wide variety of operating system 317 platforms.

The Java runtime system 315 interprets the Java byte code 301 and Java class libraries 307 to run the Java program. If the Java VM is coupled to a Web browser, the Java program is called a Java Applet. Alternately, if the Java VM is not coupled to a Web browser, the Java program is called a Java Application.

In the preferred embodiment each function described for the Java I/O toolkit is a member of the Java class libraries 307. Each function invoked through a call in the Java byte code 301 is dynamically loaded.

Figure 4:
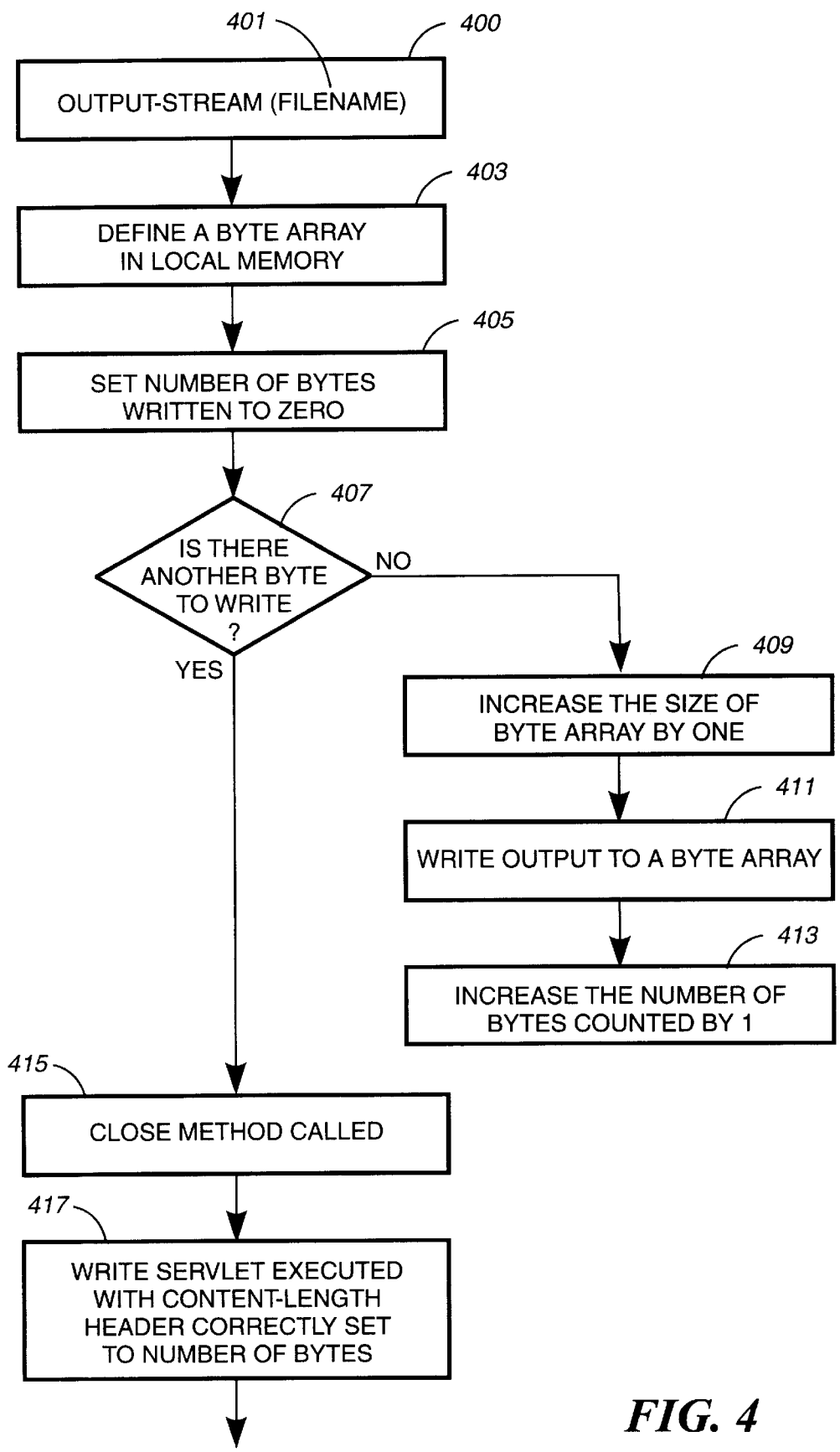
FIG. 4 is a flow chart of the Java I/O Toolkit function for an output stream according to the present invention.

Referring now to FIG. 4, is a flow chart of the Java I/O Toolkit function for an output stream according to the present invention. The flow chart begins with a Java function 400 with one parameter filename 401. The function defines an array in local memory, e.g., RAM 217, of information processing system 200, step 403. A byte counter is reset to zero in step 405. A conditional function 407, tests to determine if there is a byte to write. When there is another byte to write, the size of the array is increased by one, setup 409, and the byte is written to the byte array, step 411. The byte counter is increased by 1, step 413, and the process is repeated through conditional statement 407 until there are no remaining bytes to write. The above steps can be implemented using the ByteArrayOutputStream in the library java.io that ships with Java developers toolkit from Sun Microsystems. The method is closed, step 415. The number of bytes to be written in byte array is read, and this number is used to set the length of the output stream, step 417. For HTTP transmissions, this is the Content-Length header in the HTTP/1.0 definitions for a servlet application.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for performing I/O (Input/Output) operations in an information processing unit comprising:

defining an I/O class for passing data into the program and for passing data out of the program;

creating an object with a first class method based on the I/O class for the interpretative based program for execution on an Interpretative Machine (IM) not coupled to a Web browser and a second class method based on the I/O class for execution on an IM coupled to a Web browser; wherein the object is an instance of the I/O class with the I/O class having its own procedures and data variables for performing I/O operations;

receiving a request to pass data of unknown length out of the program:

allocating a local buffer in the information processing unit to write the data of unknown length thereto;

writing the data of unknown length to the local buffer;

determining the length of the data of unknown length in the local buffer;

passing the length of the data combined with the data in the buffer out of the program; and checking to determine whether the interpretative based program is being executed on an IM not coupled to a Web browser or on an IM coupled to a Web browser;

if the interpretative based program is executing on an IM not coupled to a Web browser, executing the first class method; wherein the first class method perform I/O operations during execution of the interpretative based program; and if the interpretative based program is executing on an IM coupled to a Web browser, executing the second class method; wherein either the second class method perform I/O operations during execution of the interpretative based program.

2. The method to perform I/O operations of claim 1, wherein the step of passing the length of the data includes the sub-steps of:

passing the length of the data in the content-length header field as required by the Hypertext Transfer Protocol (HTTP); and passing the data itself as part of the entity-body in the message as defined by the HTTP standard.

3. The method to perform I/O operations of claim 1, wherein the step of creating an object with a first class method based on the I/O class for the interpretative based program for execution includes creating an object with a first class method based on the I/O class for the interpretative based program for execution using a Java based program.

4. The method to perform I/O operations of claim 1, wherein the step of executing on an IM not coupled to a Web browser includes executing an interpretative based program running on an IM not coupled to a Web Browser is a JAVA Application.

5. The method to perform I/O operations of claim 1, wherein the step of executing on an IM coupled to a Web browser includes executing an interpretative based program running on an IM not coupled to a Web Browser is a JAVA Applet.

6. The method to perform I/O operations of claim 1, wherein the step of creating an object with a first class method based on the I/O class for the interpretative based program for execution on an Interpretative Machine (IM) includes the IM running a Java Virtual Machine.

7. The method to perform I/O operations of claim 1, further comprising:

defining an I/O class for passing data into the information processing unit and for passing data out of the information processing unit; wherein at least part of the passing of data is through use of a file name.

8. A computer readable medium containing program instructions for performing I/O (Input/Output) operations in a information processing unit, the program instruction comprising instructions for:

defining an I/O class for passing data into the program and for passing data out of the program;

creating an object with a first class method based on the I/O class for the interpretative based program for execution on an Interpretative Machine (IM) not coupled to a Web browser and a second class method based on the I/O class for execution on an IM coupled to a Web browser; wherein the object is an instance of the I/O class with the I/O class having its own procedures and data variables for performing I/O operations;

receiving a request to pass data of unknown length out of the program;

allocating a local buffer in the information processing unit to write the data of unknown length thereto;

writing the data of unknown length to the local buffer;

determining the length of the data of unknown length in the local buffer;

passing the length of the data combined with the data in the buffer out of the program; and checking to determine whether the interpretative based program is being executed on an IM not coupled to a Web browser or on an IM coupled to a Web browser;

if the interpretative based program is executing on an IM not coupled to a Web browser, executing the first class method; wherein the first class method perform I/O operations during execution of the interpretative based program; and if the interpretative based program is executing on an IM coupled to a Web browser, executing the second class method; wherein either the second class method perform I/O operations during execution of the interpretative based program.

9. The computer readable medium of claim 8, wherein the step of passing the length of the data includes the sub-steps of:

passing the length of the data in the content-length header field as required by the Hypertext Transfer Protocol (HTTP); and passing the data itself as part of the entity-body in the message as defined by the HTTP standard.

10. The computer readable medium of claim 8, wherein the instruction of creating an object with a first class method based on the I/O class for the interpretative based program for execution includes creating an object with a first class method based on the I/O class for the interpretative based program for execution using a Java based program.

11. The computer readable medium of claim 8, wherein the instruction of executing on an IM not coupled to a Web browser includes executing an interpretative based program running on an IM not coupled to a Web Browser is a JAVA Application.

12. The computer readable medium of claim 8, wherein the instruction of executing on an IM coupled to a Web browser includes executing an interpretative based program running on the IM not coupled to a Web Browser is a JAVA Applet.

13. The computer readable medium of claim 8, wherein the instruction of creating an object with a first class method based on the I/O class for tho interpretative based program for execution on an Interpretative Machine (IM) includes the IM running a Java Virtual Machine.

14. The computer readable medium of claim 8, further comprising instructions for:

defining an I/O class for passing data into the information processing unit and for passing data out of the information processing unit; wherein at least part of the passing of data is through use of a file name.

15. An information processing system for performing I/O (Input/Output) comprising:

an I/O class for passing data into the program and for passing data out of the program;

an object with a first class method based on the I/O class for the interpretative based program for execution on an IM not coupled to a Web browser and a second class method based on the I/O class for execution on an Interpretative Machine (IM) coupled to a Web browser; wherein the object is an instance of the I/O class with the I/O class having its own procedures and data variables for performing I/O operations;

means for receiving a request to pass data of unknown length out of the program;

a local buffer to write the data of unknown length thereto:

means for writing the data of unknown length to the local buffer;

means determining the length of the data of unknown length in the local buffer;

means passing the length of the data combined with the data in the buffer out of the program means for checking to determine whether the interpretative based program is being executed on an IM not coupled to a Web browser or on an IM coupled to a Web browser; and means for executing one of the first class method or the second class method to performing I/O operations during execution of the interpretative based program:

so that the first class method is executed when the interpretative based program is executing on an IM not coupled to a web browser; and so that the second class method is executed when the interpretative based program is executing on an IM coupled to a web browser.

16. The information processing system of claim 15 wherein the means for passing further comprising:

a content-length header field as required by the Hypertext Transfer Protocol (HTTP) for passing the length of the data; and an entity-body in the message as defined by the HTTP standard for passing the data.

17. The information processing system of claim 15, wherein the interpretative based program is a Java based program.

18. The information processing system of claim 15, wherein the interpretative based program is a JAVA Application.

* * * * *